(12) United States Patent
Nakamoto

(10) Patent No.: US 8,014,747 B2
(45) Date of Patent: Sep. 6, 2011

(54) AMPLITUDE DETECTING DEVICE

(75) Inventor: Hiroyuki Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 741 days.

(21) Appl. No.: 12/023,247

(22) Filed: Jan. 31, 2008

(65) Prior Publication Data

US 2008/0191889 A1 Aug. 14, 2008

(30) Foreign Application Priority Data

Feb. 9, 2007 (JP) ................. 2007-030729

(51) Int. Cl.
*H04B 1/16* (2006.01)
(52) U.S. Cl. ................. 455/334; 455/210; 375/320
(58) Field of Classification Search ............ 455/205, 455/210, 214, 230, 232.1, 334, 336, 341; 375/316, 320, 340, 345
See application file for complete search history.

(56) References Cited

U.S. PATENT DOCUMENTS

| | | | | |
|---|---|---|---|---|
| 4,554,511 | A | * | 11/1985 | Braun ................. 330/9 |
| RE37,138 | E | * | 4/2001 | Dent ................. 375/340 |
| 6,686,830 | B1 | * | 2/2004 | Schirtzer ................. 340/10.2 |
| 7,353,010 | B1 | * | 4/2008 | Zhang et al. ................. 455/234.1 |
| 2005/0130615 | A1 | * | 6/2005 | Darabi ................. 455/232.1 |
| 2006/0135104 | A1 | | 6/2006 | Lee et al. |
| 2007/0290747 | A1 | * | 12/2007 | Traylor et al. ................. 330/133 |

FOREIGN PATENT DOCUMENTS

| | | |
|---|---|---|
| JP | 53-79357 | 7/1978 |
| JP | 10-336063 | 12/1998 |
| JP | 2005-236479 | 9/2005 |
| JP | 2006-174442 | 6/2006 |

OTHER PUBLICATIONS

Chun-Pang Wu "A 110-MHz 84-dB CMOS Programmable Gain Amplifier with Integrated RSSI Function" IEEE Journal of Solid-State Circuits, vol. 40, No. 6, Jun. 2005.
Japanese Office Action dated May 10, 2011, from corresponding Japanese Application No. 2007-030729.

\* cited by examiner

*Primary Examiner* — Nhan Le
(74) *Attorney, Agent, or Firm* — Katten Muchin Rosenman LLP

(57) ABSTRACT

An amplitude detecting device of the present art increases the slope of the change in output voltage corresponding to the change in amplitude of an input signal to improve the detection accuracy of amplitude change of input signal, without changing the dynamic range of the device. An amplitude detecting device of the art includes a plurality of amplifiers that amplify an input signal according to a predefined amplification rate, an amplitude detector that detects the amplitude of the signal amplified by the amplifiers, an operation circuit that operates the signal detected by the amplitude detector and obtains the amplitude value of the input signal, and a switch circuit that sets whether the signal detected by the amplitude detector is to be transmitted to the operation circuit or not.

11 Claims, 16 Drawing Sheets

FIG. 2
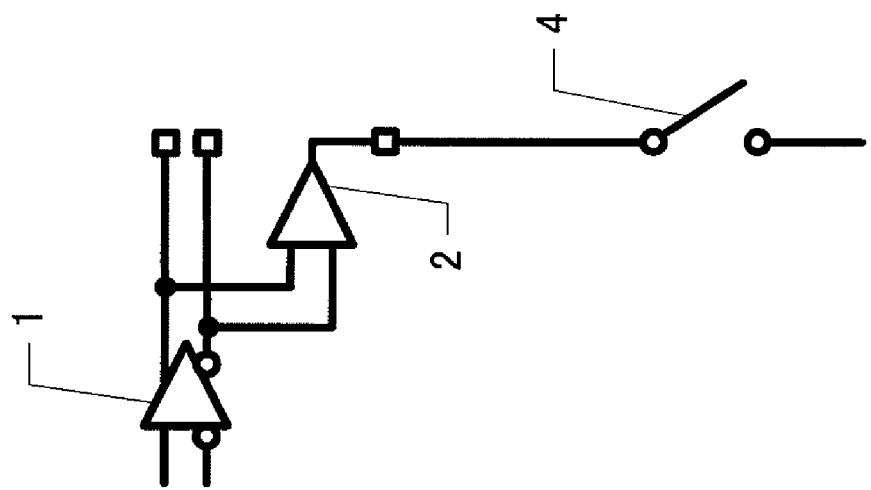
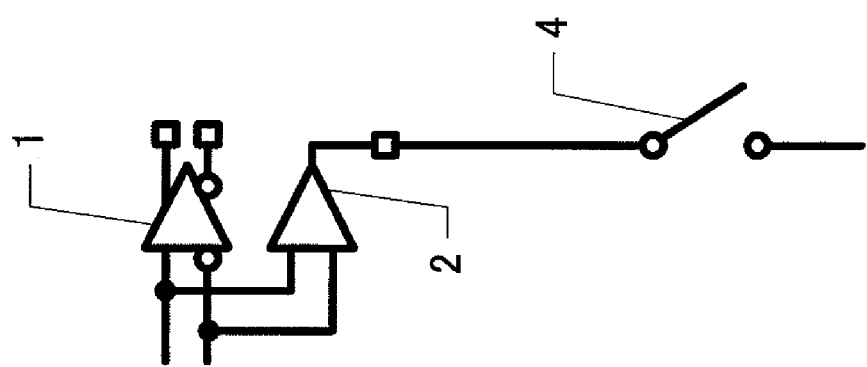

AMPLITUDE DETECTING DEVICE

BACKGROUND

1. Technical Field

The present art relates to an amplitude detecting device in the field of a wireless communication machine and, in particular, an amplitude detecting device, which is used in a transmitting section or a receiving section and can detect a change in the amplitude even when the amplitude of a transmitted or a received signal varies slightly.

2. Description of the Related Art

In recent communication by mobile units, the strength of a transmitted signal, that is, a transmission power is controlled according to the strength of a received signal from a base or relay station for the purpose of effectively using power. The transmission power is also controlled so as to satisfy the transmission power provided for the unit. Therefore, it is necessary to detect the strength of the transmitted and received signal, and Received Signal Strength Indicator (RSSI) has been often used to detect them.

The RSSI has a configuration including multiple serially connected circuit blocks each of which includes an amplifier for amplifying an input signal, and a rectifier for rectifying the input signal or the amplified signal, and an amplitude detector for detecting the current corresponding to the rectified signal. The currents generated by each of the circuit blocks are added, and a high frequency component of the signal is removed through a low-pass filter (LPF). The DC current is converted to a voltage through a resistor. The operation above can provide the voltage according to the amplitude of the input signal, and the magnitude in the range from small amplitude to large amplitude can be obtained as an absolute value of the voltage. This is described in Chun-Pang Wu and Hen-Wai Tsao, "A 110-MHz 84-dB CMOS Programmable Gain Amplifier With Integrated RSSI Function", IEEE JOURNAL OF SOLID-STATE CIRCUITS, VOL. 40, NO. 6, JUNE 2005.

However, the change in output voltage of RSSI to the change in amplitude of an input signal is constrained. This is because RSSI has to reflect the change in wide-ranging input as the monotonously output voltage, and the designer has to protect the circuit from saturating by the output voltage corresponding to the added current. In other words, the ratio of the change in output voltage to the change in amplitude of an input signal may sometimes not be increased.

In a case where the ratio may not be increased like a conventional device, the changing of output voltage may not be detected with high precision, when the changing of input signal is small. On the other hand, in a case where the output voltage is changed abruptly to the input, that is, in a case where the ratio is too high, the detected voltage may be higher than the upper limit of the circuit, when the amplitude of an input signal is large, so that RSSI can not generate the voltage corresponding to input signal.

SUMMARY

Accordingly, it is an object of the present art to provide an amplitude detecting device that can increase the ratio of the change in output voltage to the change in amplitude of an input signal and that can improve the precision for the detection of the change in amplitude of an input signal in a wide range from small amplitude to large amplitude.

In a first aspect, the present art provides an amplitude detecting device including a plurality of amplifiers whose amplification rates set beforehand, an amplitude detector for detecting an amplitude of a signal amplified by the amplifier, the operation circuit for operating the signal detected by the amplitude detector and obtaining an amplitude value of the input signal, and a switch circuit for setting whether a signal detected by the amplitude detector is transmitted to the operation circuit or not.

According to the first aspect, the current from the amplitude detector to be transmitted to the operation circuit can be selected based on the amplitude of an input signal, and the resistance which converts the current in the amplitude detector to a voltage can be increased up to the value that the circuit is not saturated. Therefore, it is possible to increase the detection ratio of the change in output voltage to the change in amplitude of an input signal, that is, that can increase the slope of the change.

In a second aspect, the present art provides an amplitude detection device including a control circuit for controlling the switch circuit, the control circuit including a comparator for comparing the signal operated by the operation circuit with two reference signals set beforehand, and controlling the signal operated by the operation circuit to take a position between the two reference signals.

According to the second aspect, the switch can be controlled to automatically select whether the current generated by the amplitude detector is transmitted to the operation circuit or not such that the voltage converted by the operation circuit can be positioned between two reference voltages according to the amplitude of an input signal.

The amplitude detecting device of the present art can increase the ratio of the change in output voltage to the change in amplitude of an input signal without increasing the dynamic range of the device.

BRIEF DESCRIPTION OF THE DRAWINGS

FIG. 2 is a block diagram showing the components in FIG. 1;

DESCRIPTION OF THE PREFERRED EMBODIMENTS

Figure 1:
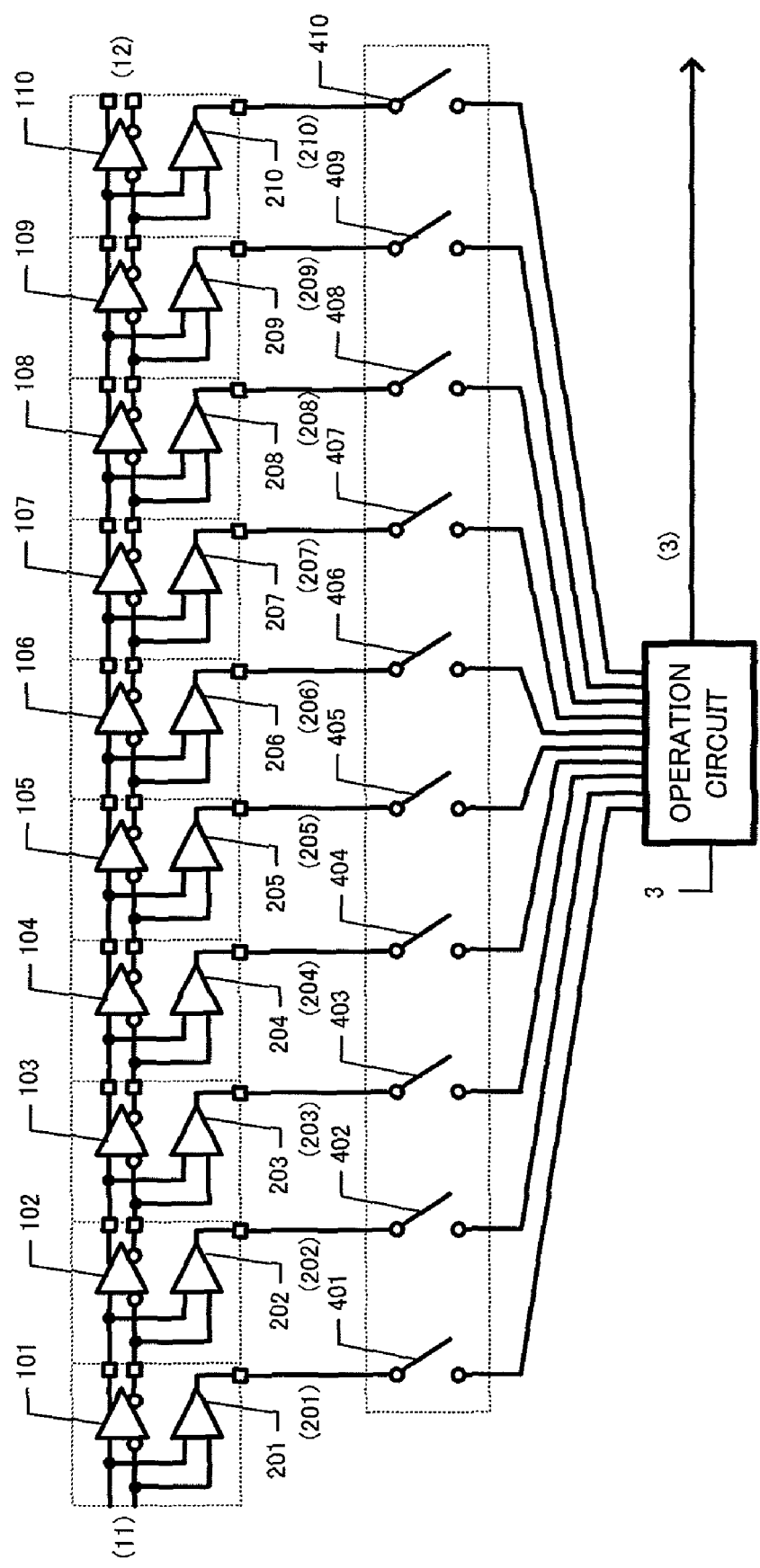
FIG. 1 is a block diagram showing one configuration of an amplitude detecting device of the present art.

With reference to drawings, details of the present art will be described below. The same reference numerals are given to identical or similar components in drawings.

First Embodiment

FIG. 1 is a block diagram and shows one configuration of an amplitude detecting device of the present art.

FIG. 1 shows amplifiers 101 to 110 having an identical circuit configuration and characteristics.

FIG. 1 further shows amplitude detectors 201 to 210 having an identical circuit configuration and detection characteristics.

FIG. 1 further shows an operation circuit 3.

FIG. 1 further shows switch circuits 401 to 410 having an identical circuit configuration.

FIG. 2 is a block diagram and shows an amplifier 1, which is a generic name for the amplifiers 101 to 110, an amplitude detector 2, which is a generic name for the amplitude detectors 201 to 210, and a switch circuit 4, which a generic name for the switch circuits 401 to 410.

The amplifier 1 amplifies an input signal (11) and generating an amplified output signal (12), and the amplification rate is predefined according to the characteristic of a device to which the present circuit is applied. The number of amplifiers may be changed according to the application, though FIG. 1 shows 10 amplifiers.

The amplitude detector 2 rectifies either input signal or output signal of the amplifier 1 and generates a current (detection current) corresponding to the amplitude of the signal.

The operation circuit 3 adds detection currents selected by the switch circuits 401 to 410, that is, detection currents (201) to (210) generated by the amplitude detectors 201 to 210. The operation circuit 3 converts the added current to a voltage and generates the output voltage (3).

Figure 3:
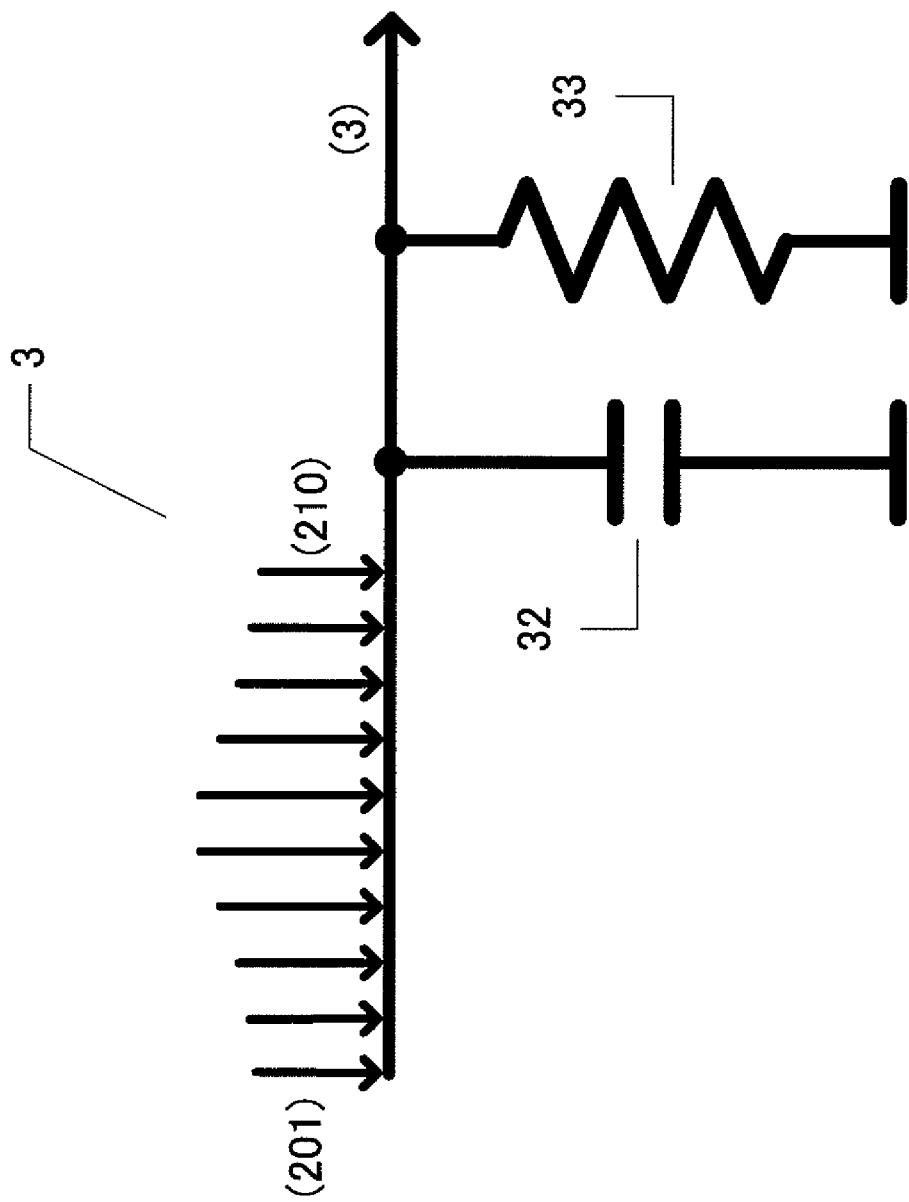
FIG. 3 is a block diagram showing one configuration of an operation circuit.

FIG. 3 is a block diagram of the operation circuit and shows one configuration of the operation circuit 3.

A resistor 33 adds the detection currents (201) to (210) and converts the voltage. A capacitor 32 and the resistor 33 also compose a low-pass filter (LPF).

The AC component of the added current is removed by the LPF.

The conventional RSSI as described above adds all of the detected circuits generated by the circuit corresponding to the amplitude detector 2 and converts to the voltage by a resistor included in an LPF.

However, this embodiment includes the switch circuit 4, and the output voltage (3) is obtained which corresponds to the detected current of the amplitude detector 2 selected by the switch circuit 4.

Therefore, the resistor 33 has a higher resistance value than that of the configuration of the conventional RSSI.

Figure 4:
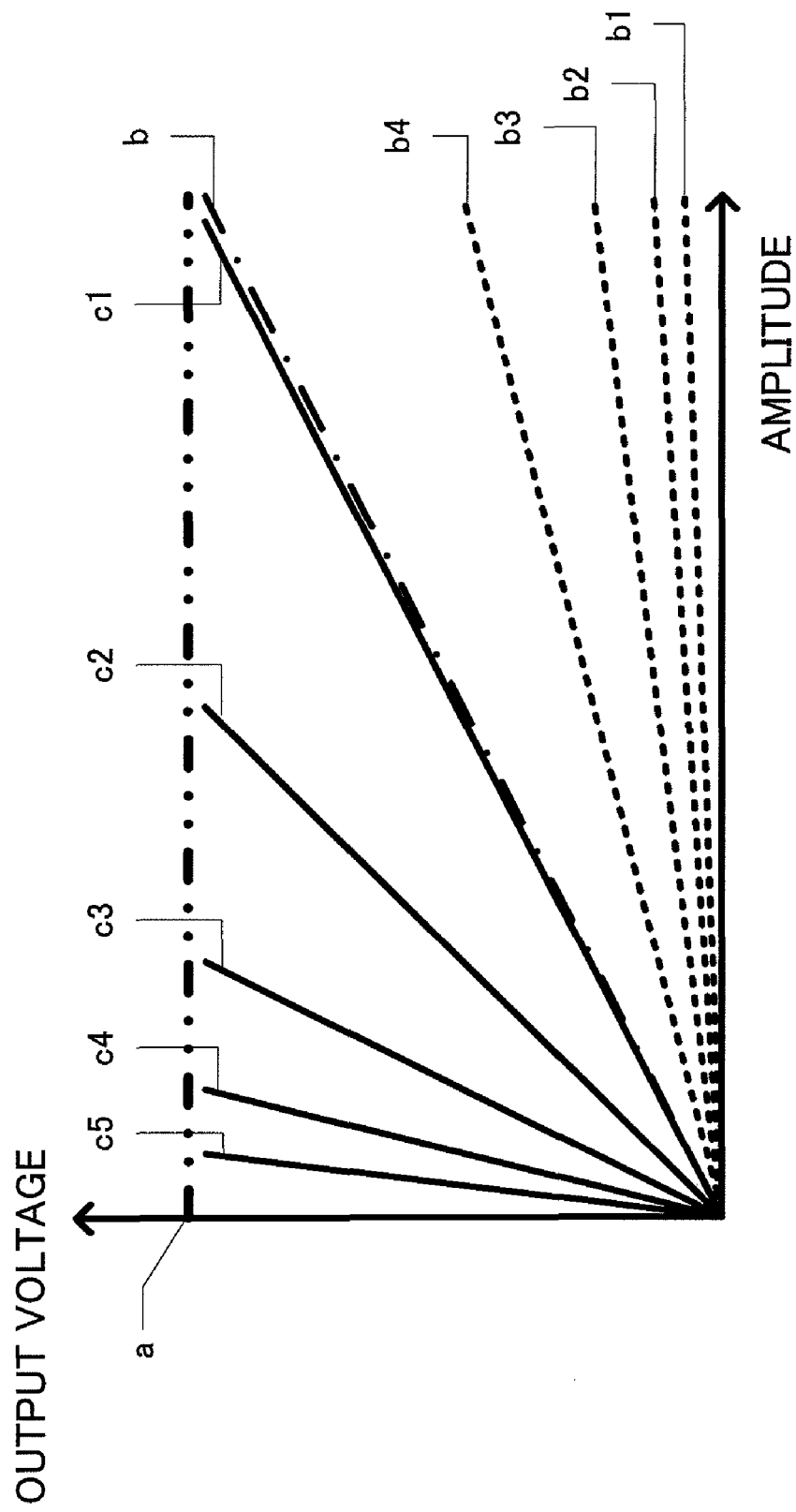
FIG. 4 is a diagram illustrating output voltage.

FIG. 4 is a diagram illustrating the output voltage.

"a" is an upper limit voltage (saturation voltage) for operating the circuits included in the amplitude detecting device of the present art.

For example, it is assumed that a gradually increasing detection current is obtained in the detection currents (201) to (210). FIG. 4 shows output voltages b1 to b4, which correspond to the detection currents (207) to (210), respectively and "b" is an output voltage converted from the total current of (201) to (210). In this case, in the configuration of the conventional RSSI, the resistance value and detection current are predefined during the design phase such that the voltage converted from the total current cannot be higher than "a" and the output voltage can be equal to "b". Therefore, the ratio of the change in output voltage (3) to the change in amplitude of the input signal (11) is determined based on the slope of the "b".

According to this embodiment, the detection current selected by the switch circuit 4 is only transmitted to the operation circuit 3 and is converted to a voltage, without adding all of the detection currents (201) to (210) generated by the amplitude detector 2. For example, "c1" is the output voltage (3) in a case where the switch circuit 406 is changed to the connection state (or is turned on), and "c2" is the output voltage (3) in a case where the switch circuit 407 is turned on. In the same manner, "c3" to "c5" are the output voltages (3) in a case where the switch circuits 408 to 410 are turned on, respectively.

Therefore, with the configuration of this embodiment, the slope of the change in output voltage (3) can be increased since the detection currents to be added by the operation circuit 3 are only the detection currents selected by the switch circuit 4, and the resistance value of the resistor 33, which converts to a voltage, can be increased in a range below "a". In other words, the change in output voltage (3) to the change in amplitude of the input signal (11) can be increased by selecting of the switch circuit 4, and the resistance value can be designed higher so as to kept it below the upper voltage "a". In particular, this is effective for a case where a large change as output voltage is required to the change in a range with small input amplitude.

Figure 5:
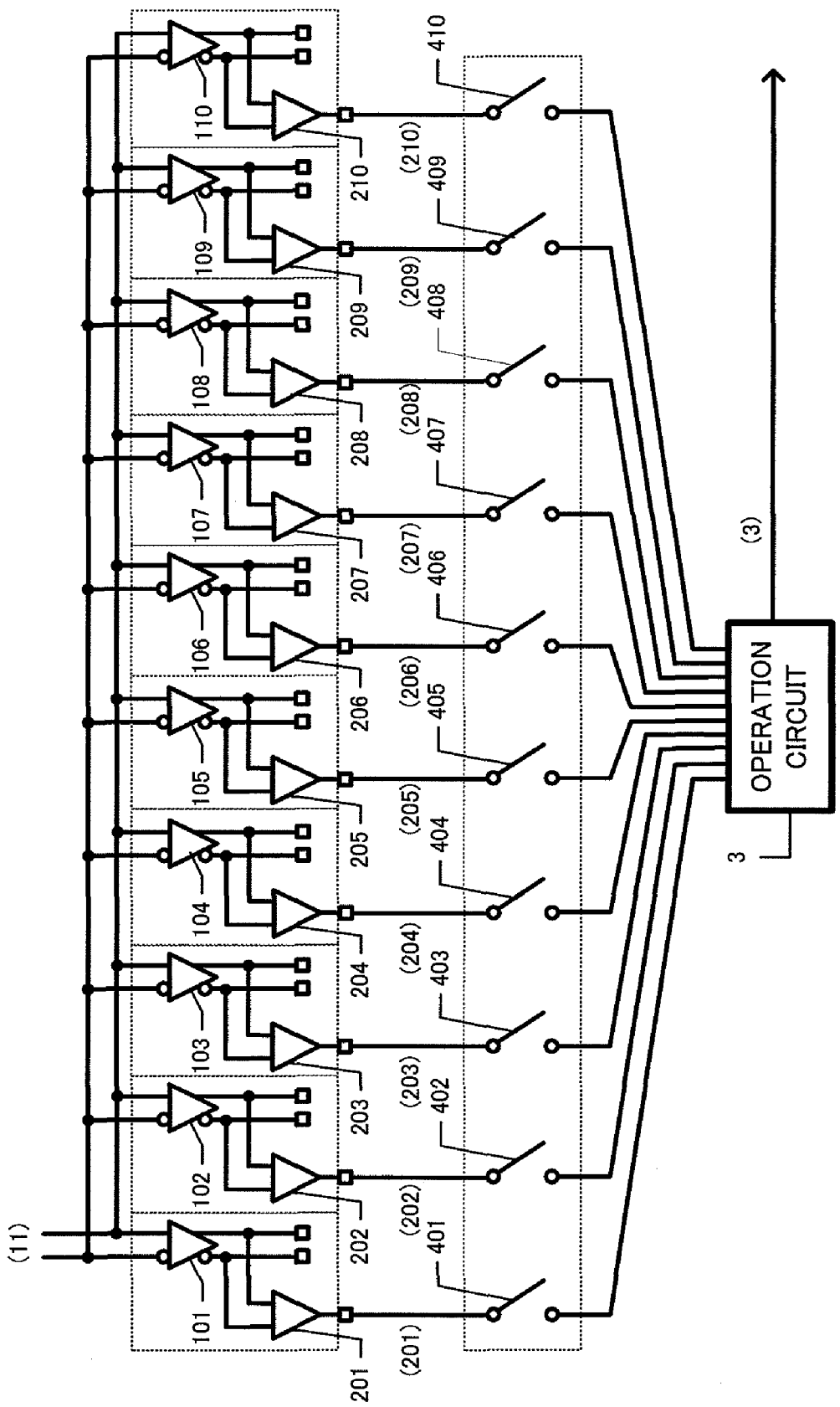
FIG. 5 is a block diagram showing one configuration of an amplitude detecting device of the present art.

According to this embodiment, the amplifiers 101 to 110 shown in FIG. 1 have identical characteristics (amplification rate), which are connected in series. However, as shown in FIG. 5, each of the amplitude detectors 201 to 210 can obtain the same effect by rectifying the output signal of each of the amplifiers 101 to 110 and generating the current (detection current) corresponding to the amplitude of the signal in a configuration in which the amplifiers 101 to 110 are connected in parallel, and the input signal (11) is received by each of the amplifiers 101 to 110 and have an amplification characteristic having different amplification rates at a predetermined ratio, like a case where the amplification ratios of the amplifiers 101, 102 and 103 are 2, 4 and 8, respectively.

Second Embodiment

Figure 6:
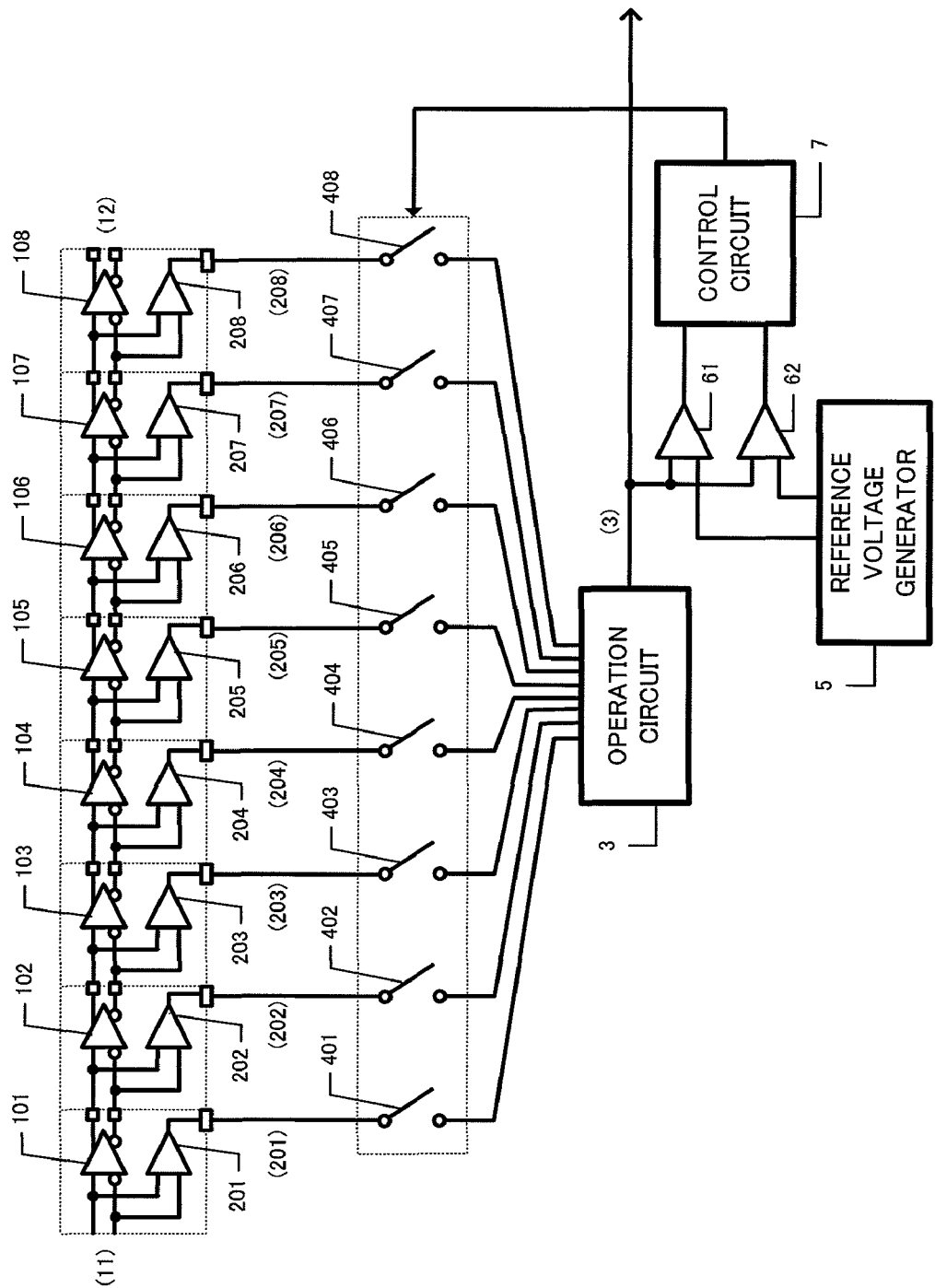
FIG. 6 is a block diagram showing one configuration of an amplitude detecting device of the present art.

FIG. 6 is a block diagram and shows one configuration of the amplitude detecting device of the present art. FIG. 6 is different from the block diagram of FIG. 1 in that FIG. 6 further shows the addition of a reference voltage generator 5, comparators 61 and 62 and a control circuit 7.

The reference voltage generator 5 generates two references, which are different from each other, such as potentials at different levels, which function as reference voltages for the comparators 61 and 62. For example, the reference voltage for the comparator 61 has a smaller value than that of the reference voltage for the comparator 62. The output voltage (3) generated by the operation circuit 3 is connected to the other side of the input terminal of each of the comparators 61 and 62.

The comparators 61 and 62 compare the output voltage (3) generated by the operation circuit 3 with the two different reference voltages generated by the reference voltage generator 5.

The control circuit 7 controls the switch circuit 4 such that the magnitude of the output voltage (3) can be positioned between the two reference voltages generated by the reference voltage generator 5, by use of the comparison results (logic level "0" or "1") from comparators 61 and 62.

The control circuit 7 turns on any one switch, for example, such as the switch circuit 405 in the switch circuits 401 to 408. Then, the comparators 61 and 62 compare the magnitude of the output voltage (3) with the two reference voltages generated by the reference voltage generator 5. If the magnitude of the output voltage (3) is larger than the two reference voltages (that is, the logic level of comparison results are both "1"), this means the output voltage (3) is too large. Therefore, the switch circuit 403 with a smaller detection current is changed to the connected state so as to decrease the output voltage (3). At the same time, the switch circuit 405 is changed to the disconnected state (OFF). If the magnitude of the output voltage (3) using switch circuit 405 is smaller than the two reference voltages (that is, the logic level of comparison results are both "0"), this means the output voltage (3) is too small. Therefore, the switch circuit 407 with a larger detection current is turned on so as to increase the output voltage (3). At the same time, the switch circuit 405 is turned off.

In the same manner, if the comparison results by the comparators 61 and 62 when the switch circuit 403 is ON are both large, the switch circuit 401 is turned on. If they are both small, the switch circuit 404 is turned on.

If the comparison results by the comparators 61 and 62 when the switch circuit 407 is ON are both large, the switch circuit 406 is turned on. If they are both small, the switch circuit 408 is turned on.

The configuration of this embodiment allows control to automatically select the appropriate switch by comparing the output voltage (3) with two reference voltages multiple number of times. Furthermore, since the configuration allows typically setting the output voltage (3) between the reference voltages, the input range of the circuit connected with the amplitude detecting device can be defined, which allows flexible design. Still further, the amplitude of the input signal (11) can be identified by monitoring which switch in the switch circuits (401) to (408) is turned on.

Third Embodiment

Figure 7:
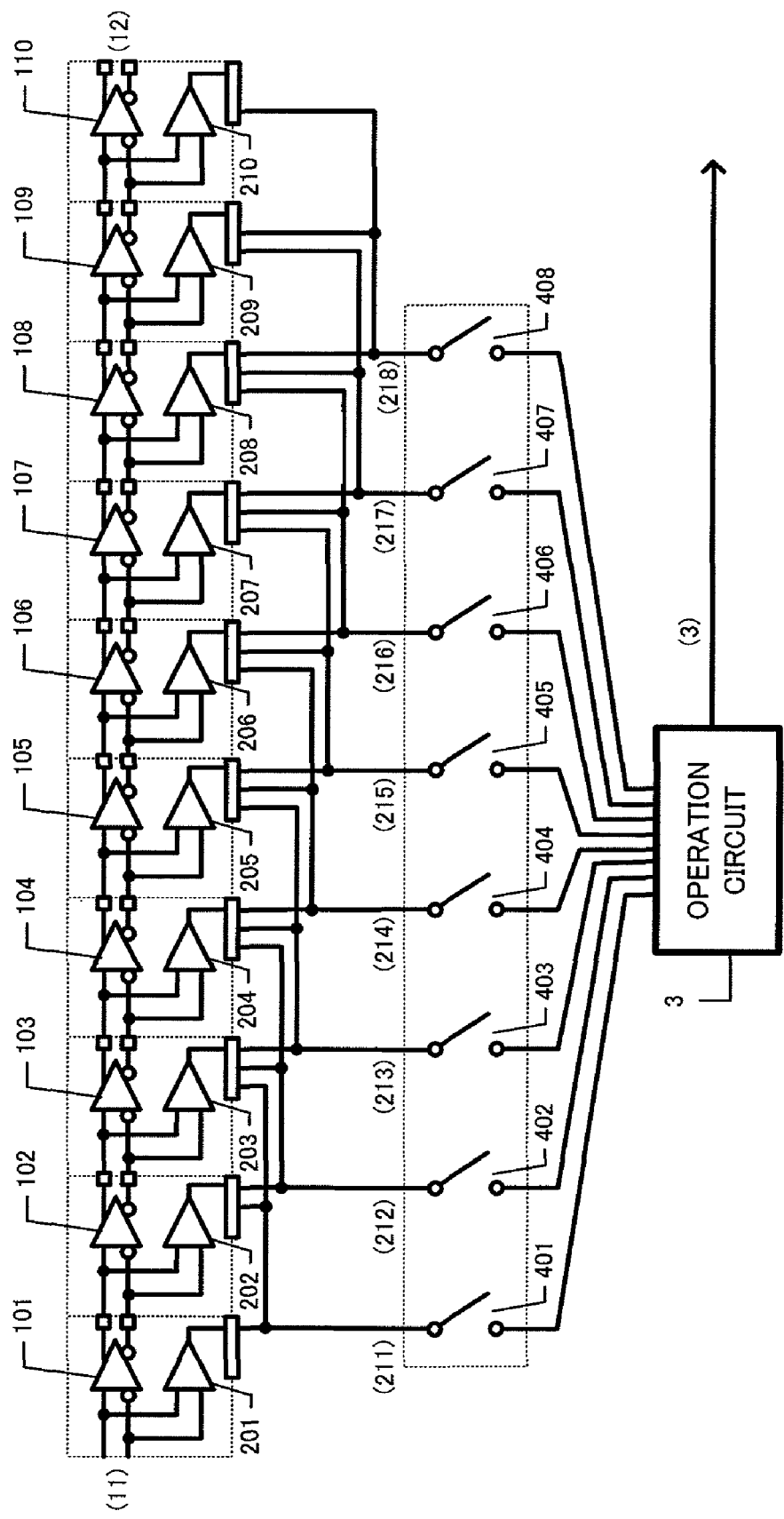
FIG. 7 is a block diagram showing one configuration of an amplitude detecting device of the present art.

FIG. 7 shows a block diagram which three consecutive amplitude detectors 2 are connected with one switch.

Figure 8:
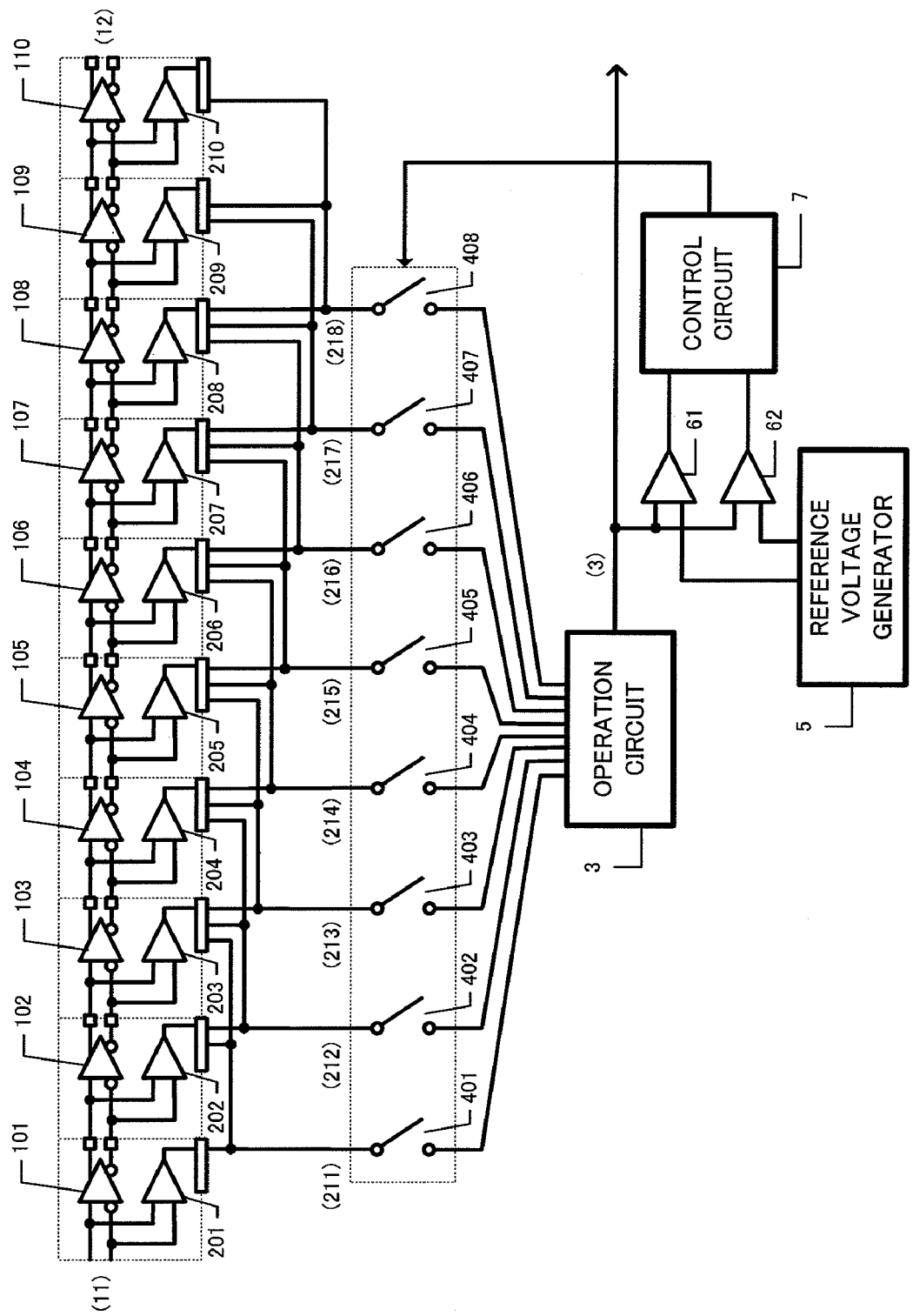
FIG. 8 is a block diagram showing one configuration of an amplitude detecting device of the present art.

FIG. 8 is a block diagram which added the reference generator 5 and comparators 61, 62 and control circuit 7 to FIG. 7, as well as FIG. 6.

In FIGS. 7 and 8, a detection current (211) which shows the addition of the detection currents generated by the amplitude detectors 201, 202 and 203 flows into the switch circuit 401, for example. Also, a detection current (212) which shows the addition of the detection currents generated by the amplitude detectors 202, 203 and 204 flows into the switch circuit 402. In the same manner, a detection current (218) which shows the addition of the detection currents generated by the amplitude detectors 208, 209 and 210 flows into the switch circuit 408.

Figure 9:
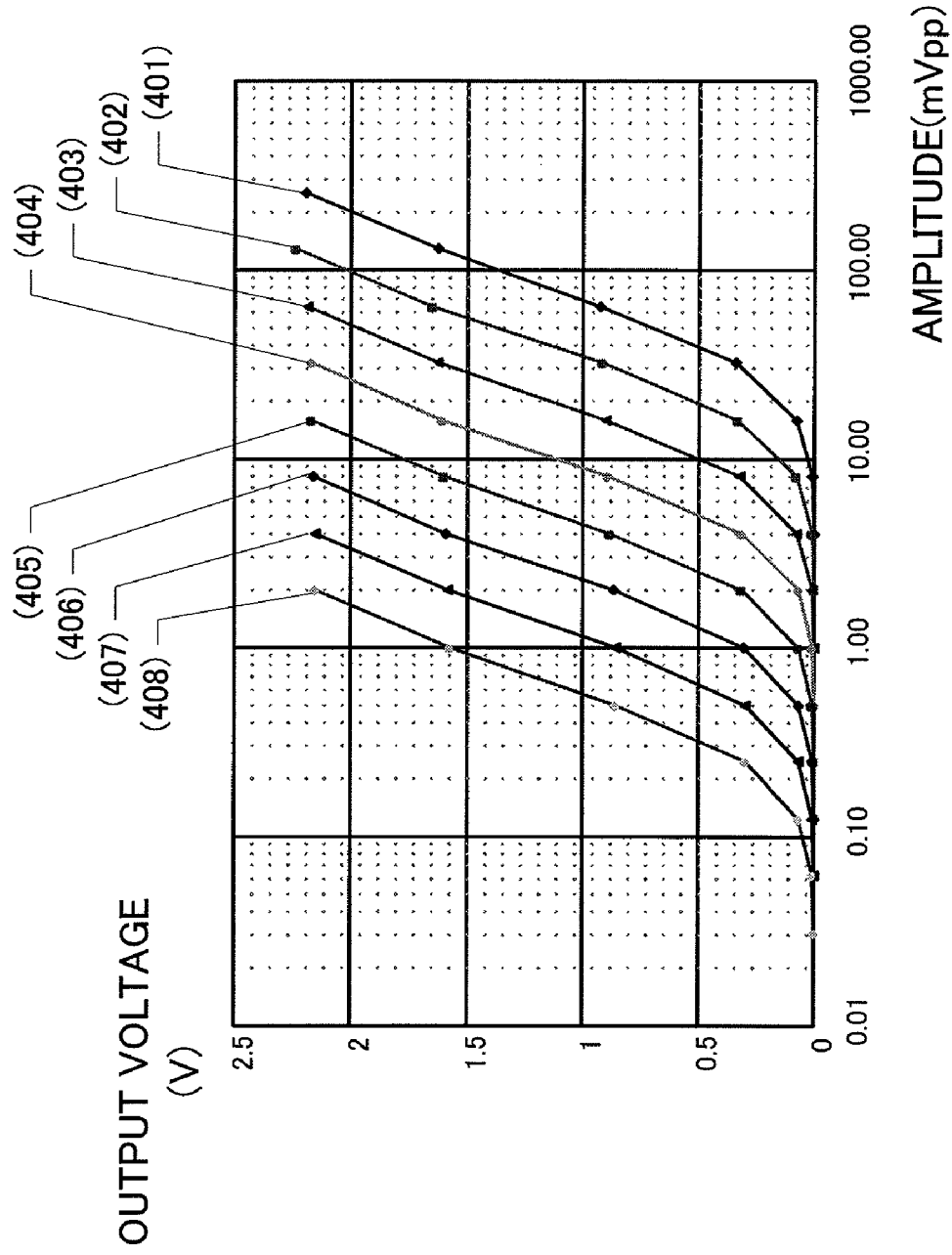
FIG. 9 is a simulation result of the amplitude detecting device.

FIG. 9 is the simulation result which shows the output voltage (3) as a function of the amplitude of the input signal (11), in a case where one of the switch circuits 401 to 408 shown in FIGS. 7 and 8 is turned on. Each of the eight graphs (401) to (408) is given in a case where three consecutive amplitude detectors 2 are connected to one switch circuit 4. For example, the graph (408) shows the output voltage (3) in the range with small amplitude when the switch circuit 408 is turned on. The graph (401) shows the output voltage (3) in the range with large amplitude when the switch circuit 401 is turned on.

Figure 10:
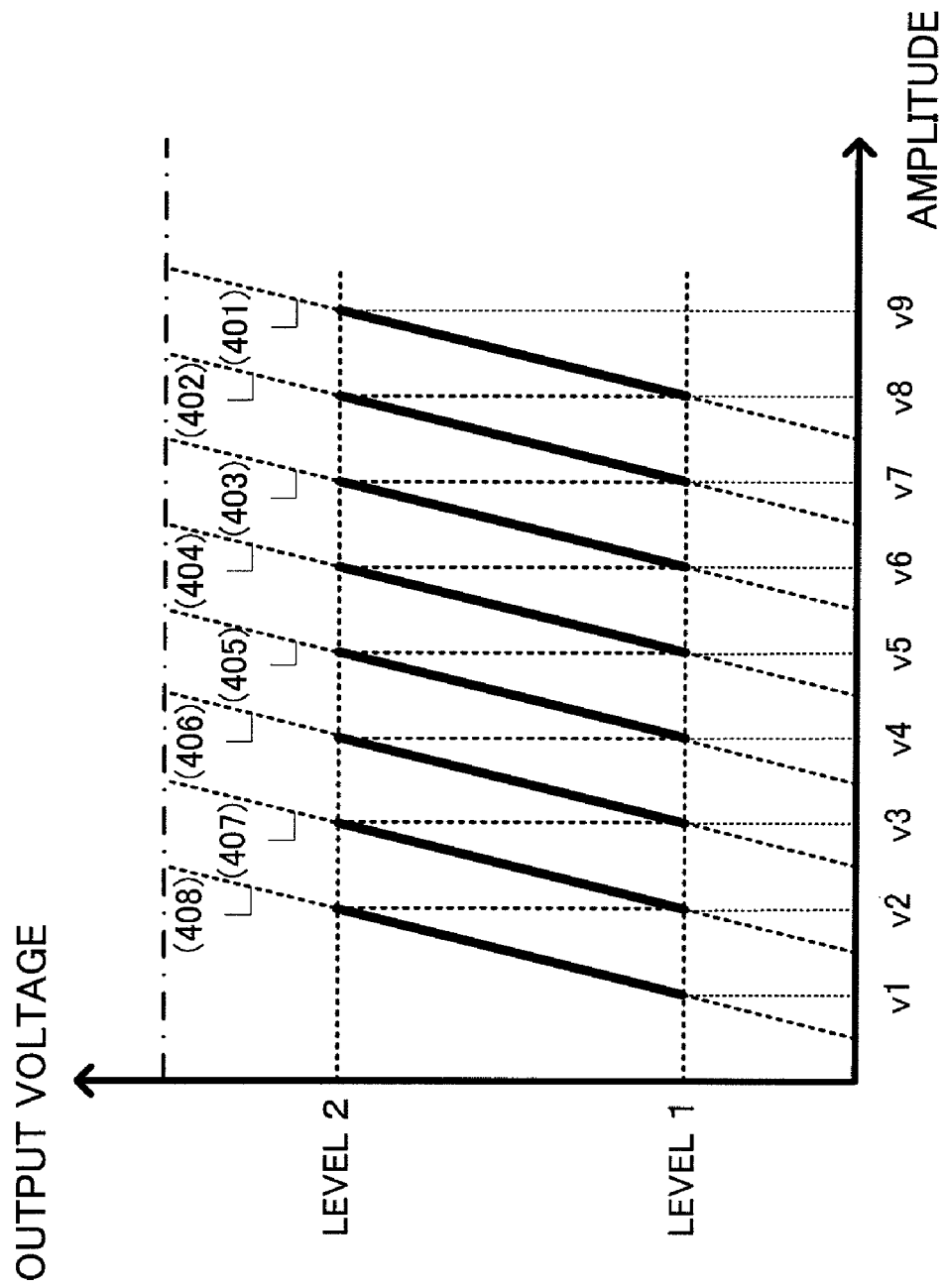
FIG. 10 is a diagram illustrating reference voltages.

FIG. 10 is a diagram illustrating the reference voltages. FIG. 10 shows the output voltage as a function of the amplitude when one of the switch circuits 401 to 408 is turned on based on FIG. 9. The reference voltage generator 5 sets Levels 1 and 2 as the reference voltages for the comparators 61 and 62 so as to be able to cover a wide range of amplitudes.

For example, the graph (401) in FIG. 10 shows the relationship between the amplitude and the output voltage when the switch circuit 401 is turned on. Therefore, in the range where the amplitude voltage is v8 to v9, the change in amplitude appears as the change in output voltage based on the slope of the graph (401) by turning on the switch circuit 401. In the same manner, the graph (405) in FIG. 10 shows the relationship between the amplitude and the output voltage when the switch circuit 405 is turned on. Therefore, in the range where the amplitude voltage is v4 to v5, the change in amplitude appears as the change in output voltage based on the slope of the graph (405) by turning on the switch circuit 405.

An operation of the control circuit 7 shown in FIG. 8 will be described with reference to FIG. 10. As an example of the control, a case where a binary search is performed will be explained.

It is assumed, for example, that the output voltage (3) generated by the operation circuit 3 is between the amplitudes v2 and v3.

The control circuit 7 turns on one switch, such as the switch circuit 404 in the switch circuits 401 to 408. Then, the comparators 61 and 62 compare the magnitude of the output voltage (3) with the two reference voltages Level 1 and Level 2 generated by the reference voltage generator 5. Since the magnitude of the output voltage (3) is smaller than Level 1 and Level 2, the switch circuit 406 is turned on. At the same time, the switch circuit 404 is turned off.

At the state that the switch circuit 406 is ON, the comparators 61 and 62 compare the magnitude of the output voltage (3) with the reference voltages Level 1 and Level 2. Since the magnitude of the output voltage (3) is smaller than Level 1 and Level 2, the switch circuit 408 is turned on. At the same time, the switch circuit 406 is turned off.

At the state that the switch circuit 408 is ON, the comparators 61 and 62 compare the magnitude of the output voltage (3) with the reference voltages Level 1 and Level 2. Since the magnitude of the output voltage (3) is larger than Level 1 and Level 2, the switch circuit 407 is turned on. At the same time, the switch circuit 408 is turned off.

At the state that the switch circuit 407 is ON, the comparators 61 and 62 compare the magnitude of the output voltage (3) with the reference voltages Level 1 and Level 2. Since the magnitude of the output voltage (3) is larger than Level 1 and is smaller than Level 2, the ON state of the switch circuit 407 is kept. In this way, by changing the ON and OFF states with binary searches based on the comparison results of the comparators 61 and 62 from the center switch, the switch circuit 4 can be selected appropriately by a few comparisons.

The configuration of this embodiment allows setting an amplitude range covered by one switch circuit 4, and setting the slope of the output voltage to the amplitude based on the number of amplitude detectors 2 controlled by one switch circuit 4. Furthermore, the voltage range of the circuit connected to the subsequent stage and the reference voltages which they are set that output voltage become to be continuous to the amplitudes may be used to automatically select the switch circuit 4 to be turned on according to the magnitude of the output voltage (3). The amplitude of the input signal (11) can be identified by monitoring which switch circuit is turned ON.

Fourth Embodiment

Figure 11:
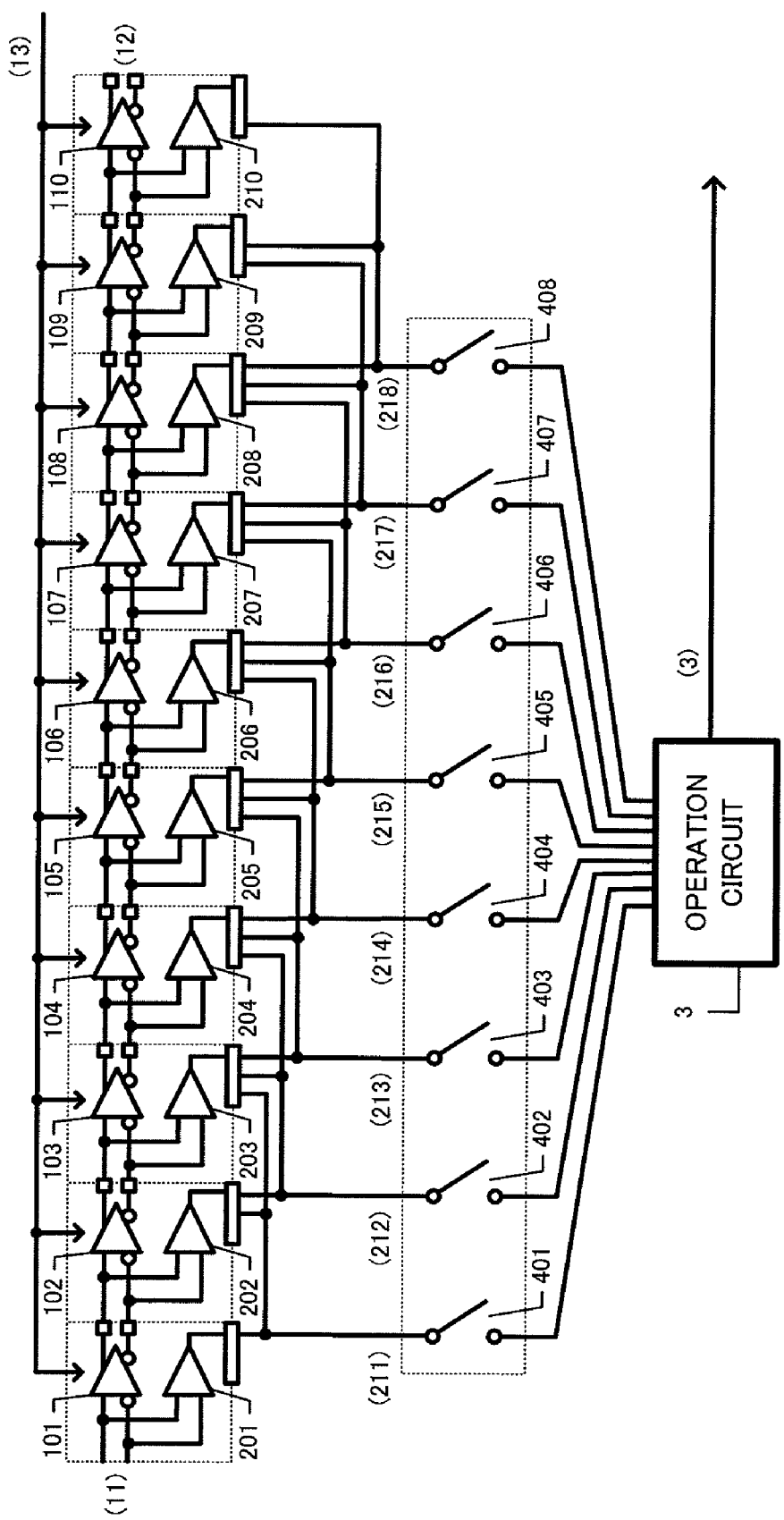
FIG. 11 is a block diagram showing one configuration of an amplitude detecting device of the present art.

FIG. 11 is a block diagram showing a configuration in which the amplifier 1 can change the amplification rate based on an external control signal (13). For example, the changing of the amplification rate may be implemented by the changing of the load resistance of an amplifier that determines the amplification rate controlled by the external signal (13).

According to this embodiment, the value of the current flowing into the operation circuit 3 in FIG. 2 is large, since increasing the amplification rate of the amplifier increases the current detected by the amplitude detector 2. In a case where the amplification rate of the amplifier is doubled without changing the resistor 33 in FIG. 3, for example, the output voltage (3) determined by the product of the detection current and the resistor 33 is twice as much as the input signal (11). Therefore, the slope of the characteristic in FIG. 9 can be increased, since the output voltage changes to double to the same amplitude (horizontal axis). At that time, the range of detectable amplitudes is narrowed, since it reaches the saturation voltage "a" in FIG. 4 by small amplitude. In a case with a reduced amplification rate on the other hand, the range of the detectable amplitudes can be increased while the slope is decreased. In this way, by externally defining a proper amplification rate according to the input signal (11), the precision (slope) of the amplitude detection and the range of detectable amplitudes can be adjusted even in a wide range of amplitudes.

Fifth Embodiment

Figure 12:
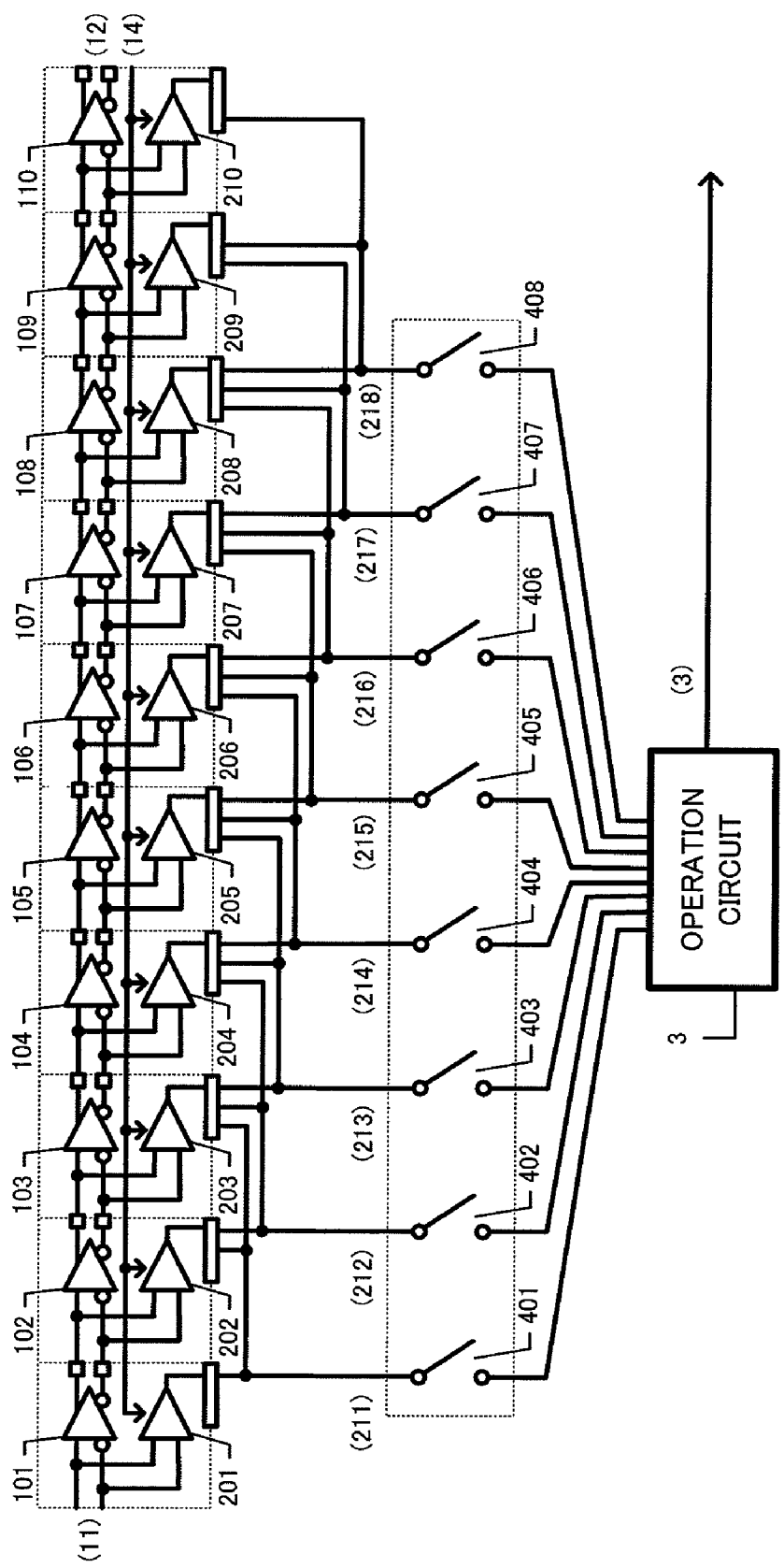
FIG. 12 is a block diagram showing one configuration of an amplitude detecting device of the present art.

FIG. 12 is a block diagram showing a configuration in which the amplitude detector 2 can change the amplification rate of detection current based on an external control signal (14). The amplification rate for detection current can be easily implemented by changing the current mirror rate, for example, based on the external control signal (14).

According to this embodiment, like the fourth embodiment, the slope of the characteristic in FIG. 9 can be increased, since the detection current flowing into the operation circuit 3 can be increased by increasing the amplification rate of the detection current of the amplitude detector 2 based on the external control signal (14). At that time, the range of detectable amplitudes is narrowed, since it reaches the saturation voltage "a" in FIG. 4 by small amplitude. When the amplification rate is small, the opposite is approved. In this way, by externally defining a proper amplification rate according to the input signal (11), the precision (slope) of the amplitude detection and the range of detectable amplitudes can be adjusted even in a wide range of amplitudes.

Sixth Embodiment

Figure 13:
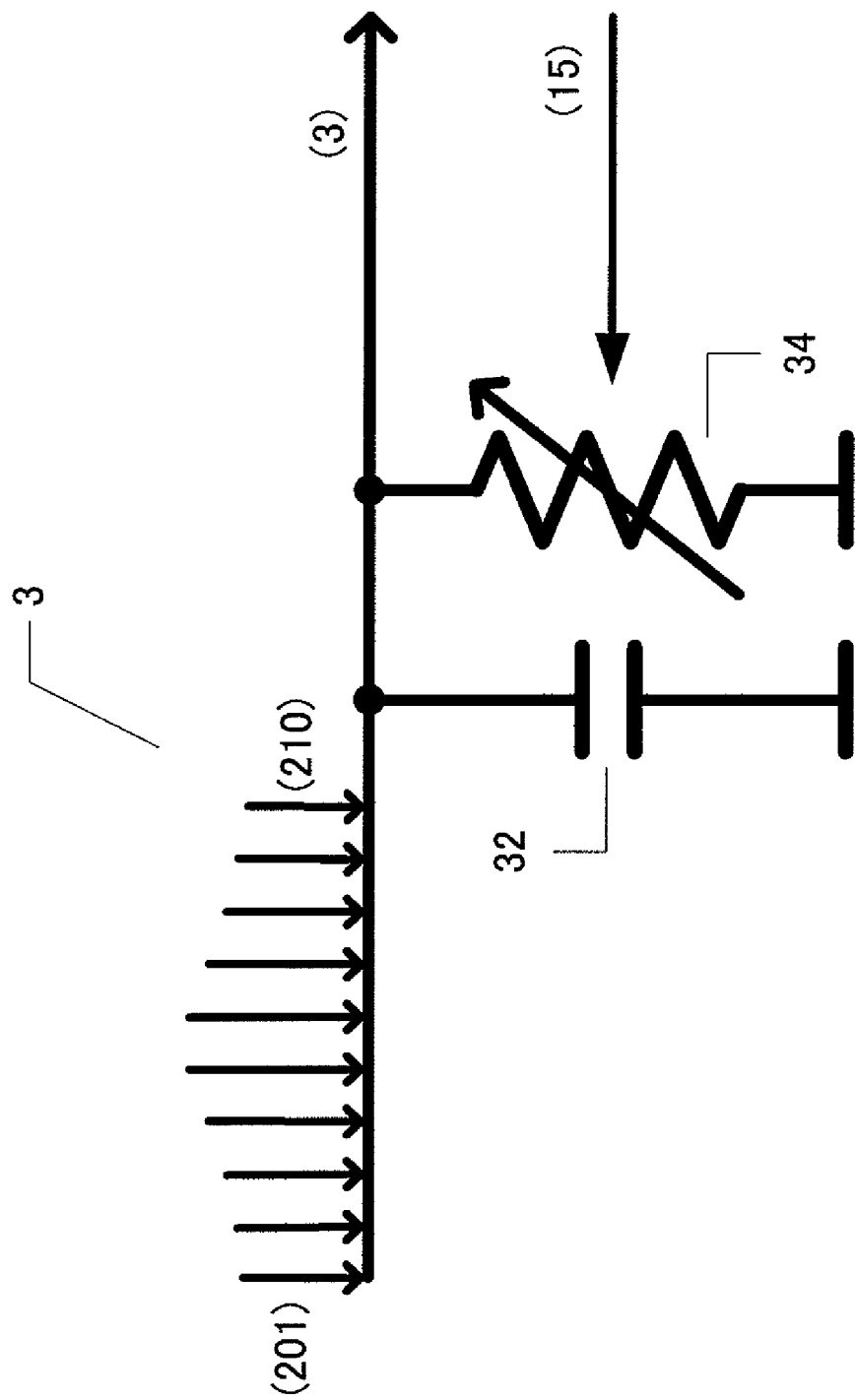
FIG. 13 is a block diagram showing one configuration of an operation circuit.

FIG. 13 is a block diagram of an operation circuit having a configuration in which the resistor 33 in FIG. 3 is replaced by a variable resistor 34, which can control the resistance value based on an external control signal (15). The variable resistor 34 can be easily implemented by selecting a resistor through an analog switch controlled by the control signal (15).

According to this embodiment, the output voltage (3) can be large, in a case where an amplitude detection obtained from an input signal (11) is converted to a voltage through a large resistance. On the other hand, the output voltage (3) can be small, in a case with the conversion through a small resistance. In other words, the slope of the change in output voltage (3) to the change in amplitude of the input signal (11) can be made variable. At that time, like the fourth embodiment, the range of detectable amplitudes is narrower with a large resistance and is wider with a small resistance. In this way, by externally defining a proper amplification rate according to the input signal (11), the precision (slope) of the amplitude detection and the range of detectable amplitudes can be adjusted even in a wide range of amplitudes.

Seventh Embodiment

Figure 14:
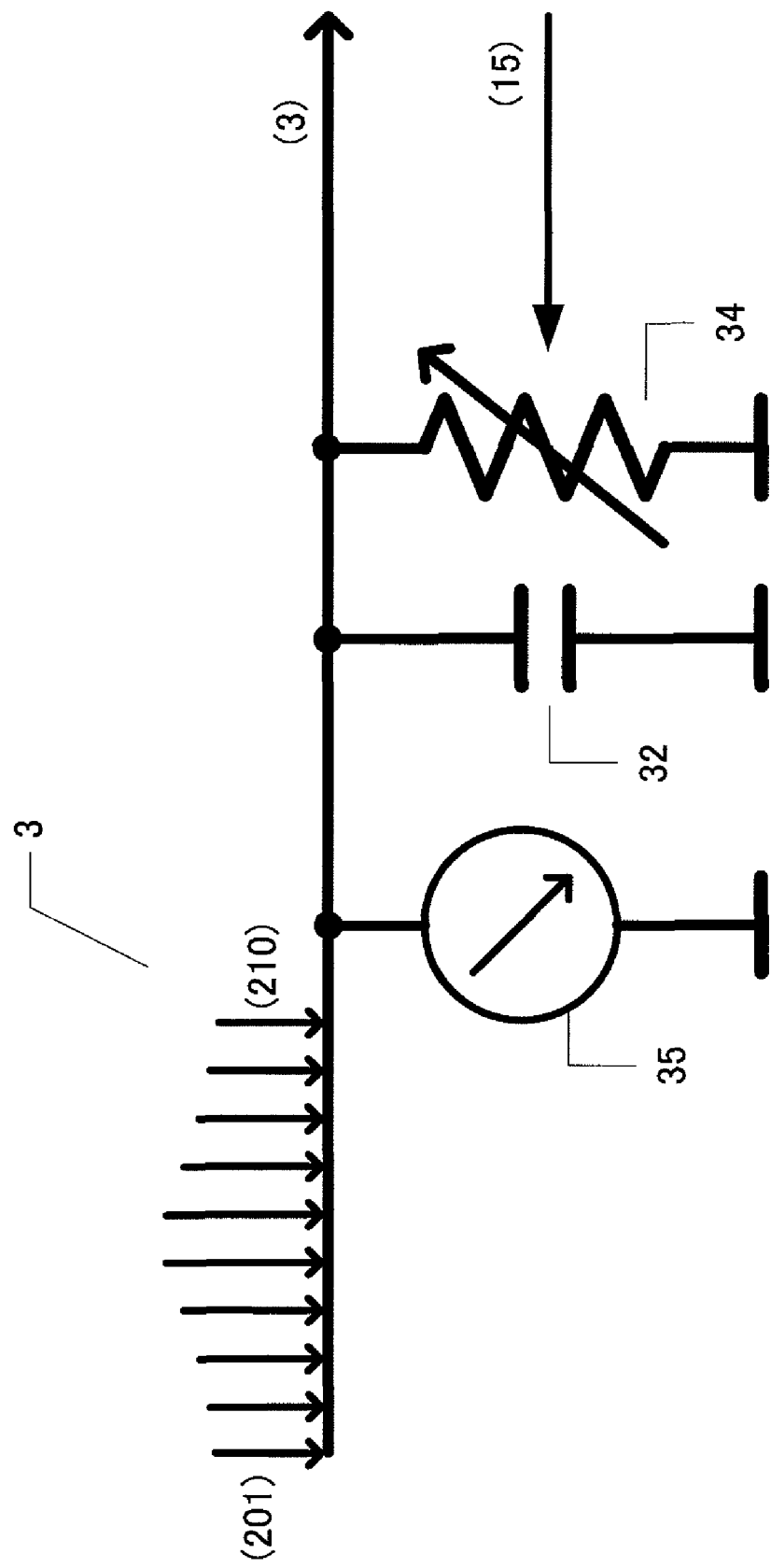
FIG. 14 is a block diagram showing one configuration of an operation circuit.

FIG. 14 is a block diagram of an operation circuit including a constant current source 35 for discharging a part of a detection current added by the variable resistor 34. By discharging the part current which does not correspond to the change in detection current from the constant current source 35 and by increasing the resistance value of the variable current 34, only the part current corresponding to the change in detection current can be extracted as a large change in output current (3). The part of the detection current is determined based on a predefined correction current.

According to this embodiment, the slope of the change in output voltage to the change in amplitude of an input signal can be increased, since the part current corresponding to the change is converted into output voltage by increasing resistance of the variable resistance 34. Therefore, the precision for the detection of the change in amplitude of an input signal can be increased.

For example, the output voltage is 1V where the detection current value is 1 mA and the resistance value of the variable resistor 34 is 1 kΩ. The output voltage is 0.9 V where the detection current is 0.9 mA. The difference voltage is 0.1 V. Next, 0.5 mA is discharged by the constant current source 35, and the resistance value of the variable resistor 34 is changed to 2 kΩ. When the detection current value is 1 mA, the current flowing to the variable resistor 34 is 0.5 mA, and the output voltage is 1 V. When the detection current value is 0.9 mA, the current flowing to the variable resistor 34 is 0.4 mA, and the output voltage is 0.8 V. Therefore, the difference voltage is 0.2 V. As a result, the difference of the output voltage is twice as much as the case without the constant current source 35, and the slope of the change in output voltage to the change in amplitude of an input signal can be increased.

Eighth Embodiment

Figure 15:
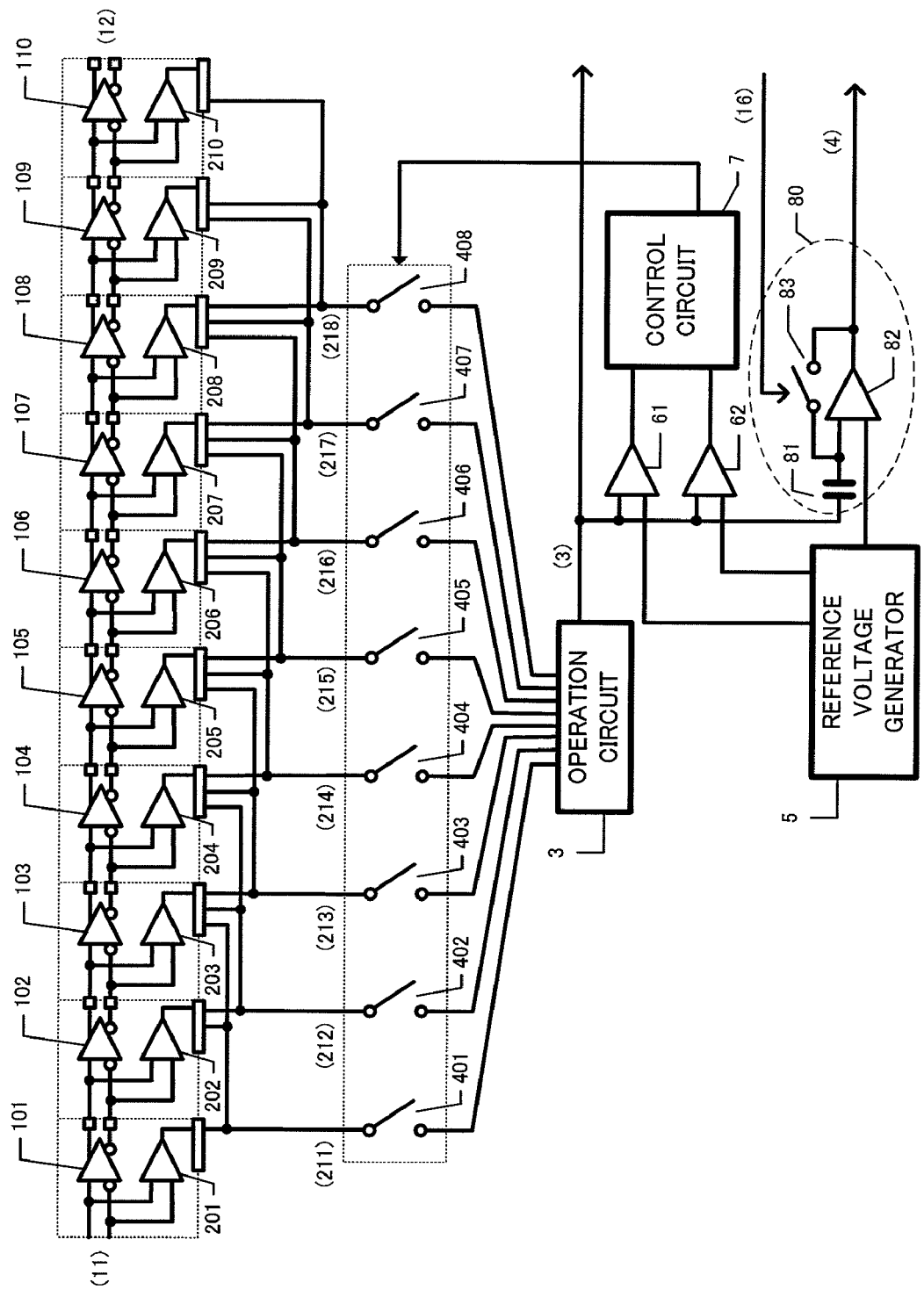
FIG. 15 is a block diagram showing one configuration of an amplitude detecting device of the present art.

FIG. 15 is a block diagram which includes a comparator 80, compared with the block diagram in FIG. 8, which is composed of a comparator 82, a capacitor 81 and a switch circuit 83. The comparator 80 generates a level determination signal (4) and a switch circuit 83 is controlled by a control signal (16).

The comparator 82 receives the output voltage (3) through the capacitor 81 and compares it with reference voltage set by the reference voltage generator 5.

At the state that the switch circuit 83 is ON, the potentials of two input terminals of the comparator 82 are same, that is, are the voltage set by the reference voltage from the reference voltage generator 5. The potential difference of the capacitor 81 is the difference between the output voltage (3) and the reference voltage.

When the switch circuit 83 is ON, the output of the comparator 82 and the potential of the side connecting to the comparator 82 of the capacitor 81 are equal. Under this condition, since the input difference in the comparator 82 is the same as the amplification of the input difference, the potential of the side connecting to the comparator 82 of the capacitor 81 is equal to the reference voltage (virtual ground). Therefore, charges corresponding to the difference between the reference voltage and the output potential of the operation circuit 3 are conserved at the capacitor 81. When the switch circuit 83 is turned off next, the charges of the capacitor 81 are conserved based on the principle of charge conservation. Thus, the change in output voltage of the operation circuit 3 directly appears the potential of the side connecting to the comparator 82 of the capacitor 81, and the information is amplified by the comparator 82. For example, if the output potential of the operation circuit 3 is lower than that of the time when the switch circuit 83 is ON, the potential of the side connecting to the comparator 82 of the capacitor 81 is lower than the virtual ground, that is, the reference voltage. In this case, the level determination signal (4) from the comparator 80 is also low. If the output potential of the operation circuit (3) is higher than the potential at the time when the switch circuit 83 is ON, the level determination signal (4) from the comparator 80 is high. The comparator 80 allows the determination of the level between two different signals having a slight difference in amplitude, before and behind switch circuit 83.

This embodiment allows determining the level between two different signals having a slight different in amplitude.

Ninth Embodiment

Figure 16:
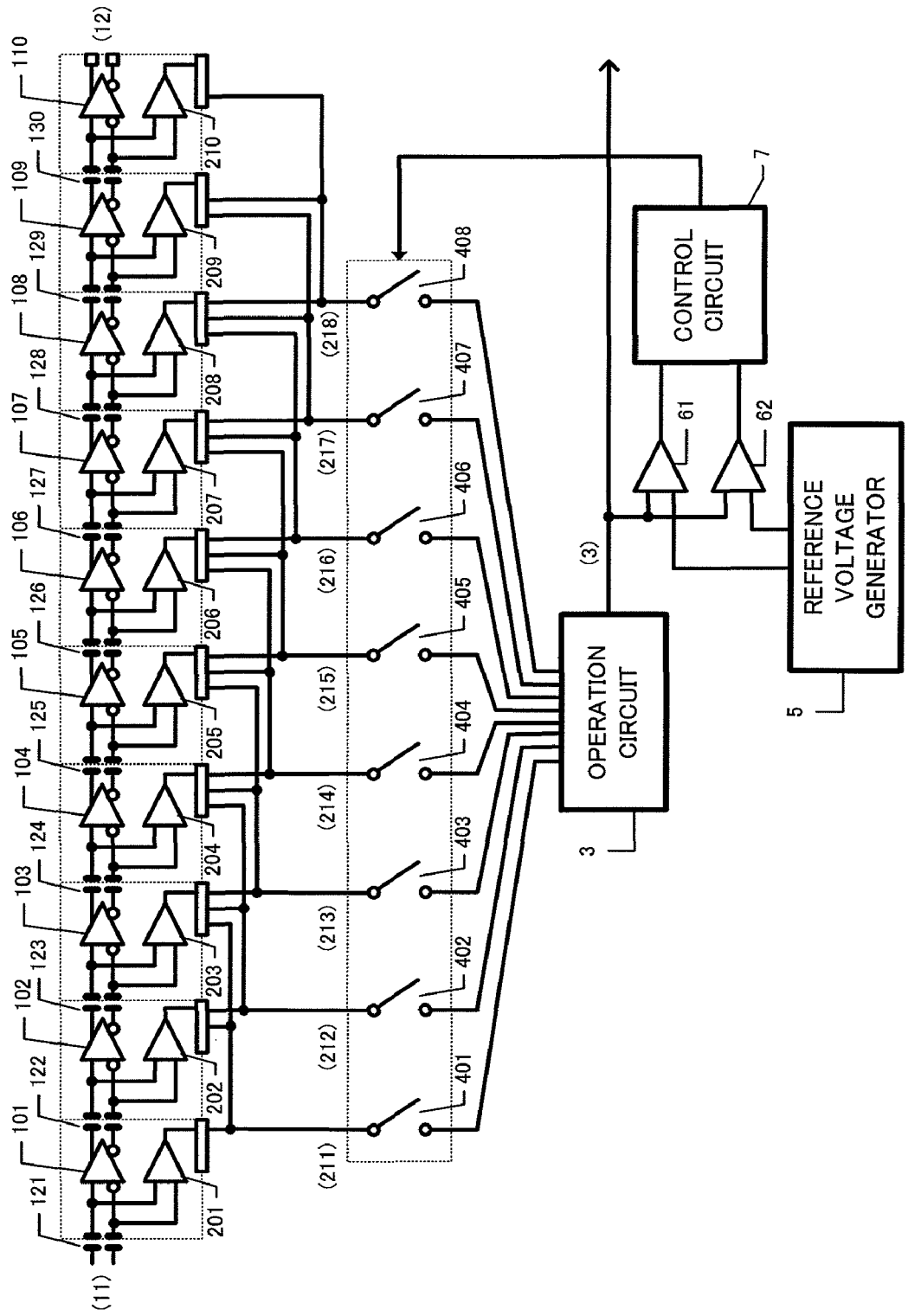
FIG. 16 is a block diagram showing one configuration of an amplitude detecting device of the present art.

FIG. 16 is a block diagram in which the amplifiers 1 are connected in series through capacitors 121 to 130, compared with FIG. 8.

For example, the amplifier 101 and the amplitude detector 201 receive an input signal through the capacitor 121. The amplifier 102 and the amplitude detector 202 receive the output signal of the amplifier 101 through the capacitor 122. In the same manner, the amplifier 110 and the amplitude detector 210 receive the output signal of the amplifier 109 through the capacitor 130.

This embodiment allows the removal of the DC component of an input signal and the elimination of a DC offset of the circuits in the amplitude detecting device of the art, which has been described in the embodiments above. Therefore, the circuits can operate with stability and with high accuracy.

In relation to embodiments including the first to ninth embodiments above, following appendices will be further disclosed.

What is claimed is:

1. An amplitude detecting device comprising:
a plurality of amplifiers for amplifying an input signal;
an amplitude detector for detecting an amplitude of a signal amplified by the amplifier and generating a current corresponding to the amplitude;
an operation circuit for adding each current generated by the amplitude detector and converting the added current to a voltage to obtain an amplitude value of the input signal; and
a switch circuit for setting whether a signal detected by the amplitude detector is transmitted to the operation circuit or not.

2. The amplitude detecting device according to claim 1, wherein the plurality of amplifiers is connected in series.

3. The amplitude detecting device according to claim 1, wherein the switch circuit sets whether signals detected by some consecutive amplitude detector are transmitted to the operation circuit or not.

4. The amplitude detecting device according to claim 1, wherein each of the plurality of the amplifiers has an amplification rate being variable based on a control signal.

5. The amplitude detecting device according to claim 1, wherein each of the plurality of amplitude detectors has a current amplification rate being variable based on a control signal.

6. The amplitude detecting device according to claim 1, wherein the operation circuit includes a variable resistor for changing a value of a resistance by a control signal so as to convert the added current into the voltage.

7. The amplitude detecting device according to claim 1, wherein the operation circuit converts the added current including the additional charge or discharge current into a voltage.

8. The amplitude detecting device according to claim 1, wherein the input signal transmitted to each of the amplifier and the amplitude detector is transmitted through a coupling capacitor.

9. An amplitude detecting device comprising:
a plurality of amplifiers for amplifying an input signal;
an amplitude detector for detecting an amplitude of a signal amplified by the amplifier;
an operation circuit for operating the signal detected by the amplitude detector and obtaining an amplitude value of the input signal;
a switch circuit for setting whether a signal detected by the amplitude detector is transmitted to the operation circuit or not; and
a control circuit for controlling the switch circuit, the control circuit including a comparator for comparing the signal operated by the operation circuit with two reference signals set beforehand, and controlling the signal operated by the operation circuit to take a position between the two reference signals.

10. The amplitude detecting device according to claim 9, wherein the amplitude detector generates a current corresponding to the amplitude of the signal amplified by the amplifier, the operation circuit adds each current generated by an amplitude detector and converts the added current to a voltage.

11. The amplitude detecting device according to claim 9, further comprising:
a comparator for comparing voltages of the signal operated by the operation circuit at a comparison time predefined.

* * * * *